United States Patent
Eijsbouts et al.

(10) Patent No.: US 7,087,546 B2
(45) Date of Patent: *Aug. 8, 2006

(54) PROCESS FOR REGENERATING AND REJUVENATING ADDITIVE-BASED CATALYSTS

(75) Inventors: Sonja Eijsbouts, Nieuwkuijk (NL); Franciscus Wilhelmus Houtert, Landsmeer (NL); Marcel Adriaan Jansen, Nieuw-Vennep (NL); Tetsuro Kamo, Ehime pref. (JP); Frans Lodewijk Plantenga, Amersfoort (NL)

(73) Assignee: Albemarle Corporation, Richmond, VA (US)

( * ) Notice: Subject to any disclaimer, the term of this patent is extended or adjusted under 35 U.S.C. 154(b) by 229 days.

This patent is subject to a terminal disclaimer.

(21) Appl. No.: 10/289,058

(22) Filed: Nov. 6, 2002

(65) Prior Publication Data

US 2003/0104926 A1 Jun. 5, 2003

Related U.S. Application Data

(63) Continuation-in-part of application No. 09/609,125, filed on Jul. 3, 2000, now abandoned.

(60) Provisional application No. 60/142,632, filed on Jul. 6, 1999.

(30) Foreign Application Priority Data

Jul. 5, 1999 (EP) .................................. 99202193

(51) Int. Cl.
*B01J 20/34* (2006.01)
(52) U.S. Cl. ........................... 502/33; 502/29; 502/514
(58) Field of Classification Search ................... 502/38, 502/49, 22, 29, 31, 33, 514
See application file for complete search history.

(56) References Cited

U.S. PATENT DOCUMENTS

| 4,028,227 | A | 6/1977 | Gustafson | 208/216 |
| 4,122,000 | A | 10/1978 | Farrell et al. | 208/210 |
| 4,486,616 | A | 12/1984 | Chu et al. | 585/466 |
| 5,155,075 | A | 10/1992 | Innes et al. | 502/52 |
| 5,275,990 | A | 1/1994 | Clark et al. | 502/43 |
| 6,635,596 | B1 * | 10/2003 | Eijsbouts et al. | 502/38 |

FOREIGN PATENT DOCUMENTS

| EP | 0 156 226 A2 | 10/1985 |
| EP | 0 601 722 A1 | 6/1994 |
| EP | 1 043 069 A1 | 10/2000 |
| FR | 2 699 430 | 6/1994 |
| JP | 4-166231 | 6/1992 |
| JP | 4-166233 | 6/1992 |
| JP | 6-210182 | 8/1994 |
| JP | 6-339635 | 12/1994 |
| WO | WO 96/41848 | 12/1996 |

OTHER PUBLICATIONS

European Search Report No. EP 99 20 2193 dated Nov. 12, 1999.
International Search Report No. PCT/EP 00/06050 dated Oct. 10, 2000.
Derwent Abstract 94-227099/28 abstracting FR 2 699 430.
Derwent Abstract 92-246393/30 abstracting JP 4-166231.
Derwent Abstract 92-246395/30 abstracting JP 4-166233.
Derwent Abstract 94-282690/35 abstracting JP 6-210182.
Derwent Abstract 95-063417/09 abstracting JP 6-339635.
Furimsky, E. et al., "Regeneration of Hydroprocessing Catalysts," Catal. Today, 17(4), (1993), pp. 561-606, 623-624, 640-645, 654-659.
Dufresne, P. et al., "Off-Site Regeneration of Hydroprocessing Catalysts," Revue de L'Institut Francais du Petrole, 50(2), (1995), pp. 283-293.
Furimsky, E., "Hydroprocessing Catalysts. Utilization and Regeneration Schemes," Revue de L'Institut Francais du Petrole 44(3), (1989), pp. 337-354.
Yoshimura, Y. et al., "Oxidative Regeneration of Hydrotreating Catalysts," Appl. Catal., 23(1), (1986), pp. 157-171.

* cited by examiner

*Primary Examiner*—Edward M. Johnson
(74) *Attorney, Agent, or Firm*—Frank C. Eymard

(57) ABSTRACT

The present invention pertains to a process for regenerating and rejuvenating an additive-based hydrotreating catalyst containing Group VIB and Group VIII hydrogenation metals. The process comprises the steps of regenerating the catalyst by contacting it with an oxygen-containing gas at a maximum temperature of 500° C., followed by rejuvenating the catalyst by contacting it with an organic additive comprising an organic compound, other than a compound that the catalyst is contacted with in the course of its use as a catalyst prior to regeneration and rejuvenation. The organic additive is incorporated into the catalyst. If necessary, the catalyst may then be dried at such a temperature that at least 50% of the additive is maintained in the catalyst. The process according to the invention makes it possible to restore the activity of a used additive-based hydrotreating catalyst to its original level, or even to improve it to above that level.

3 Claims, No Drawings

US 7,087,546 B2

PROCESS FOR REGENERATING AND REJUVENATING ADDITIVE-BASED CATALYSTS

The present application is a continuation-in-part of U.S. application Ser. No. 09/609,125, filed Jul. 3, 2000, now abandoned that claims priority of European Patent Application Serial No. 99202193.1, filed Jul. 5, 1999 and U.S. Provisional Patent Application Ser. No. 60/142,632, filed Jul. 6, 1999, the contents of all of which are incorporated by reference herein in their entirety.

BACKGROUND OF THE INVENTION

1. Field of the Invention

The present invention relates to a process for regenerating and rejuvenating additive-based catalysts.

2. Prior art

Innes et al. (U.S. Pat. No. 5,155,075) discloses a process for regenerating a coke contaminated reforming catalyst comprising platinum on a molecular sieve. The process involves contacting the catalyst with a halogen-free oxygen-containing gas at a temperature of less than 780° F. and then oxidizing the coke. The catalyst is then suitable for use in the reforming process where C6–C11 paraffins, olefins and naphthenes are converted to aromatic compounds.

Additive-containing hydrotreating catalysts are known in the art. For example, European patent application 0 601 722 describes hydrotreating catalysts comprising a gamma-alumina support impregnated with a Group VIB metal component, a Group VII metal component, and an organic additive which is at least one compound selected from the group of compounds comprising at least two hydroxyl groups and 2–10 carbon atoms, and the (poly)ethers of these compounds.

WO 96/41848 describes a process for preparing an additive-containing catalyst in which the additive mentioned above is incorporated into a finished catalyst composition. That is, a catalyst composition comprising hydrogenation metal components in the oxidic form, brought into that form by calcination, is contacted with the specified additive.

Japanese patent application 04-166231 describes a hydrotreating catalyst prepared by a process in which a support is impregnated with an impregnation solution comprising a Group VIB metal component, a Group VII metal component, and, optionally, a phosphorus component. The support is dried at a temperature below 200° C., contacted with a polyol, and then dried again at a temperature below 200° C. Japanese patent application 04-166233 describes an alkoxycarboxylic acid-containing catalyst prepared by substantially the same process.

Japanese patent application 06-339635 describes a hydrotreating catalyst prepared by a process in which a support is impregnated with an impregnation solution comprising an organic acid, Group VIB and Group VII hydrogenation metal components, and preferably a phosphorus component. The impregnated support is dried at a temperature below 200° C. The dried impregnated support is contacted with an organic acid or polyol, after which the thus treated support is dried at a temperature below 200° C.

Japanese patent application 06-210182 describes an additive-containing catalyst based on a boria-alumina support comprising 3–15 wt. % of boria.

Non-prepublished European patent application No. 00201039 in the name of Akzo Nobel filed on Mar. 23, 2000, describes a catalyst containing an organic compound comprising N and carbonyl.

The additive-containing catalysts of the above references all show an increased activity in the hydrotreating of hydrocarbon feeds as compared to comparable catalysts which do not contain an additive.

During the hydrotreating of hydrocarbon feeds, the activity of the catalyst decreases. This is caused, int. al., by the accumulation on the catalyst surface of carbon-containing deposits, which are generally referred to as coke. The accumulation of these deposits is detrimental to the activity of the catalyst. Therefore, a catalyst is commonly regenerated after a certain period of use by burning off the coke, which renders the catalyst suitable for reuse.

However, it has been found that in the case of additive-based catalysts, the activity of the catalyst after regeneration is not always sufficient. Even when after regeneration the catalyst is again contacted with an additive in accordance with the teachings of WO 96/41848, the activity of the resulting catalyst is not always sufficient.

There is therefore need for a process for regenerating and rejuvenating additive-based catalysts in such a manner that the activity of the resulting catalyst is restored to the level of the additive-based catalyst in its fresh state. In some cases, and preferably, the activity of the regenerated and rejuvenated catalyst may be even higher than that of the fresh additive-based catalyst. In the context of the present specification, the activity of the catalyst being restored to the level of activity of the catalyst in the fresh state means that the catalyst will have a relative volume activity of at least 90 in the process for which the catalyst is intended to be used, when the activity of the fresh catalyst is set at 100.

SUMMARY OF THE INVENTION

The present invention satisfies the above need, in a primary embodiment, by the provision of a process for regenerating and rejuvenating an additive-based hydrotreating catalyst containing Group VIB and Group VIII hydrogenation metals. The process comprises the steps of regenerating the catalyst by contacting it with an oxygen-containing gas at a maximum temperature of 500° C., followed by rejuvenating the catalyst by contacting it with an organic additive comprising an organic compound, other than a compound that the catalyst is contacted with in the course of its use as a catalyst prior to regeneration and rejuvenation. The organic additive is incorporated into the catalyst. If necessary, the catalyst may then be dried at such a temperature that at least 50% of the additive is maintained in the catalyst.

In a second embodiment the present invention pertains to a regenerated additive-based hydrotreating catalyst obtained by the above process.

In a third embodiment the present invention pertains to a process for the hydrotreating of hydrocarbon feeds in which a feed is contacted at elevated temperature and pressure with the above catalyst.

Other embodiments of the present invention are based on details including catalyst stripping and regeneration conditions and process details, all of which are hereinafter disclosed in the following discussion of each of these facets of the invention.

DETAILED DESCRIPTION OF THE INVENTION

The Used Additive-based Catalyst

In the context of the present specification, the term additive-based catalyst is intended to refer to a catalyst which contained an organic additive before use, even though during use or, optionally, depending on the presulfiding conditions, during presulfiding, said additive was lost from the catalyst.

The used additive-based catalyst may have been used in any hydrotreating process. In the context of the present specification, hydrotreating is intended to refer to all processes in which one or more of hydrodesulfurization, hydrodenitrogenation, and hydrodearomatisation, optionally accompanied by some conversion into products with a lower boiling range, takes place. Use in (deep) hydrodesulfurization, hydrodenitrogenation, or hydrodearomatisation is most common for additive-based catalysts. Examples of suitable feeds include straight run gas oil, light catalytically cracked gas oil, and light thermally cracked gas oil, middle distillates, kero, naphtha, vacuum gas oils, heavy gas oils, and residues.

The reaction temperature generally is 200–500° C., preferably 280–430° C. The reactor inlet hydrogen partial pressure generally is 5–200 bar, preferably 10–150 bar. The liquid hourly space velocity preferably is between 0.1 and 10 vol./vol.h, more preferably between 0.5 and 4 vol./vol.h. The $H_2$/oil ratio generally is in the range of 50–2000 Nl/l, preferably in the range of 80–1500 Nl/l.

In principle, the used additive-based catalyst may be any used hydrotreating catalyst which comprises a Group VIB hydrogenation metal, a Group VIII hydrogenation metal, and generally a carrier, and which contained an organic additive before it was used or, as the case may be, presulfided.

As Group VIB metals may be mentioned molybdenum, tungsten, and chromium. Group VIII metals include nickel, cobalt, and iron. Catalysts comprising molybdenum as Group VIB metal component and nickel and/or cobalt as Group VIII metal component are the most common. The catalyst usually has a metal content in the range of 0.1 to 50 wt. %, calculated on the dry weight of the catalyst not containing the additive. The Group VIB metal will frequently be present in an amount of 5–35 wt. %, preferably 15–30 wt. %, calculated as trioxide. The Group VIII metal will frequently be present in an amount of 1–10 wt. %, preferably 2–7 wt. %, calculated as monoxide. The catalyst may also contain other components, such as phosphorus, halogens, and boron. Particularly, the presence of phosphorus in an amount of 1–10 wt. %, calculated as $P_2O_5$, may be preferred.

The catalyst carrier may comprise the conventional oxides, e.g., alumina, silica, silica-alumina, alumina with silica-alumina dispersed therein, silica-coated alumina, magnesia, zirconia, boria, and titania, as well as mixtures of these oxides. As a rule, preference is given to the carrier comprising alumina, silica-alumina, alumina with silica-alumina dispersed therein, or silica-coated alumina. Special preference is given to the carrier consisting essentially of alumina or alumina containing up to 25 wt. % of silica. A carrier comprising a transition alumina, for example an eta, theta, or gamma alumina is preferred within this group, with a gamma-alumina carrier being especially preferred. Additionally, the catalyst may contain 0–60 wt. % of zeolite.

The catalyst's pore volume (measured via N2 adsorption) generally is in the range of 0.25 to 1 ml/g. The specific surface area will generally be in the range of 50 to 400 $m^2$/g (measured using the BET method). Generally, the catalyst will have a median pore diameter in the range of 7–20 nm, as determined by N2 adsorption. The figures for the pore size distribution and the surface area given above are determined after calcination of the catalyst at 500° C. for one hour.

The catalyst is suitably in the form of spheres, pellets, beads, or extrudates. Examples of suitable types of extrudates have been disclosed in the literature (see, int. al., U.S. Pat. No. 4,028,227). Highly suitable are cylindrical particles (which may be hollow or not) as well as symmetrical and asymmetrical polylobed particles (2, 3 or 4 lobes).

As will be evident to the skilled person, it is particularly important that the organic additive comprise a compound or compounds other than the compound or compounds that comprise the feedstock the catalyst is contacted with in the course of its use as a catalyst prior to regeneration and rejuvenation. The feedstock that is subjected to hydrotreating with the additive based catalyst will not also function as the organic additive. The term "organic additive" as used herein refers to an organic compound that performs a rejuvenating function, i.e. the improvement of catalytic activity, as opposed to the effect of feedstock which is the reduction of catalytic activity.

The additive present in the catalyst may be any organic additive. In the context of the present specification, the term organic additive refers to an additive comprising at least one carbon atom and at least one hydrogen atom. Preferred compounds include those selected from the group of compounds comprising at least two oxygen atoms and 2–10 carbon atoms and the compounds built up from these compounds. Organic compounds selected from the group of compounds comprising at least two oxygen-containing moieties, such as a carboxyl, carbonyl or hydroxyl moieties, and 2–10 carbon atoms and the compounds built up from these compounds are preferred. Examples of suitable compounds include citric acid, tartaric acid, oxalic acid, malonic acid, malic acid, butanediol, pyruvic aldehyde, glycolic aldehyde, and acetaldol. At this point in time, preference is given to an additive that is selected from the group of compounds comprising at least two hydroxyl groups and 2–10 carbon atoms per molecule, and the (poly)ethers of these compounds. Suitable compounds from this group include aliphatic alcohols such as ethylene glycol, propylene glycol, glycerin, trimethylol ethane, trimethylol propane, etc. Ethers of these compounds include diethylene glycol, dipropylene glycol, trimethylene glycol, triethylene glycol, tributylene glycol, tetraethylene glycol, tetrapentylene glycol. This range can be extrapolated to include polyethers like polyethylene glycol with a molecular weight up to, e.g., 8,000. Other ethers which are suitable for use in the present invention include ethylene glycol monobutyl ether, diethylene glycol monomethyl ether, diethylene glycol monoethyl ether, diethylene glycol monopropyl ether, and diethylene glycol monobutyl ether. Ethylene glycol, diethylene glycol, triethylene glycol, tetraethylene glycol, propylene glycol, dipropylene glycol, and polyethylene glycol with a molecular weight between 200 and 600 are considered preferred at this point in time.

Another group of compounds comprising at least two hydroxyl groups and 2–10 carbon atoms per molecule are the saccharides. Preferred saccharides include monosaccharides such as glucose and fructose. Ethers thereof include disaccharides such as lactose, maltose, and saccharose.

Polyethers of these compounds include the polysaccharides.

A further group of additives are those compounds comprising at least one covalently bonded nitrogen atom and at least one carbonyl moiety. Examples include aminopolycarboxylic acids, such as nitrilo-triacetic acid and diethylene-triamine-pentaacetic acid. Within this group the organic compound preferably comprises at least two nitrogen atoms and preferably at least two carbonyl moieties. It is further preferred that at least one carbonyl moiety is present in a carboxyl group. It is furthermore preferred that at least one nitrogen atom is covalently bonded to at least two carbon atoms. A preferred organic compound is a compound satisfying formula (I)

(R1R2)N—R3-N(R1'R2') (I)

wherein R1, R2, R1' and R2' are independently selected from alkyl, alkenyl, and allyl with up to 10 carbon atoms optionally substituted with one or more groups selected from carbonyl, carboxyl, ester, ether, amino, or amido. R3 is an alkylene group with up to 10 carbon atoms which may be interrupted by —O— or —NR4-. R4 is selected from the same group as indicated above for R1. The R3 alkylene group may be substituted with one or more groups selected from carbonyl, carboxyl, ester, ether, amino, or amido. As has been set out above, it is essential that the organic compound of formula (I) comprises at least one carbonyl moiety.

Preferably, at least two of R1, R2, R1' and R2' have the formula —R5—COOX, wherein R5 is an alkylene group having 1–4 carbon atoms, and X is hydrogen or another cation, such as an ammonium, a sodium, a potassium and/or a lithium cation. If X is a multivalent cation, one X can adhere to two or more —R5—COO groups. Typical examples of such a compound are ethylene diamine(tetra) acetic acid (EDTA), hydroxyethylene diamine triacetic acid, and diethylene triamine pentaacetic acid.

A single compound as well as a combination of compounds may be used as additive. The amount of additive present in the additive-containing catalyst depends on the specific situation. It was found that the appropriate amount of additive generally lies in the range of 0.01–2.5 moles of additive per mole of hydrogenation metals present in the catalyst. If the amount of additive added is too low, the advantageous effect associated with its presence will not be obtained. On the other hand, the presence of an exceptionally large amount of additive will not improve its effect.

The way in which the additive was initially incorporated into the used additive-based catalyst composition is not critical to the process according to the invention. The additive may have been incorporated into the catalyst composition prior to, subsequent to, or simultaneously with the incorporation of the hydrogenation metal components.

For example, the additive can be incorporated into the catalyst composition prior to the hydrogenation metal components by being added to the carrier before the hydrogenation metal components are added. This can be done by mixing the additive with the carrier material before it is shaped, or by impregnating the shaped carrier material with the additive.

Alternatively, the additive can be incorporated into the catalyst composition simultaneously with the hydrogenation metal components. This can be done, e.g., by mixing the additive and the hydrogenation metal components with the carrier material before shaping or by impregnating the carrier with an impregnation solution comprising the hydrogenation metal components and the additive, followed by drying under such conditions that at least part of the additive is maintained in the catalyst. This latter method is described in EP 601 722.

It is also possible to incorporate the additive into the catalyst composition subsequent to the hydrogenation metal components. This can be done, e.g., by first incorporating the hydrogenation metal components into the catalyst composition, e.g., by mixing them with the carrier material or by impregnating the carrier with them, optionally followed by drying and/or calcining, and subsequently incorporating the additive, e.g., by impregnation. A method with intermediate calcination is described in WO 96/41848. At present, the additive-containing catalysts prepared by the processes described in EP 0601 722 and WO 96/41848 are considered preferred as source for the used additive-based catalyst to be used as starting material in the process according to the invention.

Depending on the nature of the additive and the way in which it is incorporated into the catalyst composition, the additive may be used in solid form, in liquid form, or dissolved in a suitable solvent. It may be preferred for the additive to be incorporated into the catalyst dissolved in water.

Before use, the additive-containing hydrotreating catalyst has optionally been subjected to a sulfiding step in which at least a portion of the hydrogenation metal components present in the catalyst is converted into the sulfidic form, either directly or after an activation treatment in the presence of hydrogen. Suitable sulfidation processes are known in the art. The sulfidation treatment can be carried out by contacting the catalyst with hydrogen sulphide at elevated temperature and pressure, with elemental sulfur, or with an organic sulfur compound such as a polysulfide. It is also possible to sulphide the catalyst by contacting it with a hydrocarbon feed to which additional sulfur compounds have been added (spiked hydrocarbon feed). The latter procedure may be preferred.

The Regeneration Step

Before the actual regeneration step of the process according to the invention, any feed remaining on the catalyst may be removed by stripping. The stripping can be carried out by contacting the catalyst with a solvent. However, it is preferred to contact the catalyst with a flowing gas stream. The stripping is generally carried out at a temperature of 0–370° C., preferably below 350° C., depending on the stripping method. If the stripping is carried out in a flowing gas stream, it is preferably carried out at a temperature of 100–370° C., preferably 100–350° C.

The stripping can be carried out using an inert gas, which may suitably comprise nitrogen, water vapor, carbon dioxide, and other components, like noble gases. If so desired, air may be used in the stripping process, but in that case, the amount of air, in particular the amount of oxygen, should be closely monitored to avoid excessive temperature rises caused by the burning off of coke and sulfur in the presence of oxygen. If air is present in the stripping gas, the removal of the feed from the catalyst may, depending on the temperature, be accompanied by the removal of some coke by combustion. In that case, in effect, feed stripping is combined with (part of the) regeneration. If air is used, the maximum temperature allowed during stripping will usually be set at a lower value than if no air is used, to anticipate the exotherm resulting from coke combustion in the presence of oxygen. The amount of oxygen present in the gas stream during the stripping step generally is between 2 and 21 vol. %. The present invention encompasses both the embodiment in which feed is removed from the catalyst without coke combustion ("pure" stripping) and the embodiment in which feed is removed from the catalyst accompanied by coke combustion (stripping combined with (part of the) regeneration). "Pure" stripping will generally take place in the absence of oxygen or, if oxygen is present, at a temperature below 230° C. Stripping combined with (part of the) regeneration will take place at a temperature above 230° C. in the presence of oxygen.

The regeneration step of the process according to the invention is carried out by contacting the optionally stripped used additive-based catalyst with an oxygen-containing gas under such conditions that the maximum catalyst temperature during the regeneration process is at most 500° C. If the maximum catalyst temperature during the regeneration step is too high, the advantageous effect of the present invention is not obtained. Preferably, the maximum catalyst temperature during the regeneration process is at most 475° C., more preferably at most 425° C. The maximum catalyst temperature during the regeneration process generally is at least 300° C., preferably at least 320° C., more preferably at least 350° C. The maximum catalyst temperature to be selected will be governed by the properties of the catalyst to be regenerated and by process constraints, a higher maximum temperature being preferred in principle because this makes it possible to reduce the regeneration time. However, if the maximum catalyst temperature is too high, the desired effect of the present invention will not be obtained. As to catalyst properties, catalysts with a higher metal content will generally require a lower maximum catalyst temperature than catalysts with a lower metal content.

It is noted that in this specification any temperature given relates to the temperature of the catalyst, except when explicitly indicated otherwise. The catalyst temperature can be determined in any way known to the skilled person, e.g., by way of appropriately placed thermocouples.

In a preferred embodiment of the present invention, the regeneration step in the presence of oxygen is carried out in two steps, namely a first lower-temperature step and a second higher-temperature step.

In the first, lower-temperature step, the catalyst is contacted with an oxygen-containing gas at a temperature of 100 to 370° C., preferably 175 to 370° C. If so desired, this low-temperature regeneration step may also be used to strip feed from the catalyst. The specific regeneration temperature in the first step will be selected depending on the amount of coke present on the catalyst and the process constraints. Care should be taken that the temperature is selected at such a value that the combustion of coke is not accompanied by an exotherm taking the catalyst temperature above the specified maximum value of 500° C. If some coke has already been removed during stripping by virtue of this step being carried out in an oxygen-containing gas, the temperature during the first regeneration step can be selected at a higher value than when the stripping step took place in the absence of oxygen. Of course, higher temperatures are always preferred in terms of process efficiency, but they carry the increased risk of the formation of an exotherm, which will cause the catalyst temperature to rise above the specified maximum.

In the second, higher-temperature regeneration step, the catalyst is contacted with an oxygen-containing gas at a temperature of 300 to 500° C., preferably 320 to 475° C., still more preferably 350–425° C. The temperature during the second step is higher than the temperature of the first step discussed above, preferably by at least 10° C., more preferably by at least 20° C.

The determination of appropriate temperature ranges is well within the scope of the skilled person, taking the above indications into account.

The suitable amount of oxygen present in the oxygen-containing gas used during the regeneration step is influenced by a number of parameters. In the first place, as mentioned above, the amount of oxygen should be monitored to ensure that the catalyst temperature stays at the selected value. How much oxygen is suitable will depend upon the way in which the process is carried out.

For example, if the catalyst is divided into relatively thin layers of, for example, 1–15 cm thickness during the regeneration step, the temperature control of the catalyst will be relatively good, and higher oxygen amounts can be allowed. The same holds when the catalyst is regenerated in a moving bed instead of a fixed bed. Since the required reaction time will be shortened when higher amounts of oxygen are used per weight of catalyst per hour, it is preferred for the catalyst to be regenerated in a moving bed process, preferably, if applicable, at a bed thickness of 1–15 cm. In the context of the present specification, the term "moving bed" is intended to refer to all processes wherein the catalyst is in movement as compared to the unit, including ebullated bed processes, fluidized processes, processes in which the catalyst is rotated through a unit, and all other processes wherein the catalyst is in movement.

Incidentally, at least if the stripping step is carried out in the presence of oxygen, it may be preferred, for better controlling of the process, to have the stripping step also carried out in a moving bed process, preferably, if applicable, at a bed thickness of 1–15 cm. Because the use of a moving bed process ensures the best possible contact between the catalyst and the regeneration gas, it may be preferred to carry out the entire regeneration process of the present invention in a moving bed, either in the same apparatus or in a different (type of) apparatus.

The regeneration step of the process of the present invention has been described above as a separate stripping step and a separate regeneration step, which may in turn be carried out in two separate steps. Nevertheless, it should be understood that the present invention also intends to cover a process in which there is no real distinction between the various steps. In such a process, the catalyst is conveyed through a furnace in which the temperature gradually increases. The catalyst may enter the furnace at room temperature, and gradually be heated to a temperature below 300° C. under a gas stream to effect stripping. Then, the catalyst temperature increases further into the low-temperature regeneration step zone, followed by a further increase into the higher-temperature regeneration step zone, with at least the regeneration steps taking place in the presence of an oxygen-containing gas. In one embodiment of this process an oxygen-containing air-stream is fed countercurrently over the catalyst, such that the oxygen concentration is high at the end of the furnace where the high-temperature regeneration step takes place. Since oxygen is consumed in the regeneration, the oxygen-concentration in the gas stream will decrease with decreasing catalyst temperature.

Of course, various variations on this process may be envisaged, of which one in which the stripping step is separated from the regeneration step may be preferred, since it makes it possible to more independently regulate the conditions prevailing during the stripping step and the regeneration step. The composition of the gas may be regulated in various manners, including the injection of gas with a specific composition into the unit(s) at various points.

The oxygen-containing gas used during the regeneration step preferably is air, optionally diluted with other gases, in particular inert gases such as nitrogen to decrease the oxygen concentration. If so desired, other suitable gases, which may contain various components as long as they do not detrimentally affect the regeneration process or cause HSE (health-safety-environment) hazards, may also be used if available.

The duration of the regeneration process including stripping will depend on the properties of the catalyst and the exact way in which the process is carried out, but will generally be between 0.25 and 24 hours, preferably between 2 and 16 hours.

Before the regeneration step (but after stripping), the carbon content of the catalyst generally is above 5 wt. %, typically between 5 and 25 wt. %. The sulfur content of the catalyst before the regeneration step generally is above 5 wt. %, typically between 5 and 20 wt. %.

After regeneration, the carbon content of the catalyst generally is below 3 wt. %, preferably below 2 wt. %, more preferably below 1 wt. %. After regeneration, the sulfur content of the catalyst generally is below 2 wt. %, preferably below 1 wt. %.

The Rejuvenation Step

After the regeneration step, the regenerated catalyst is rejuvenated by being contacted with an organic additive, if necessary followed by drying under such conditions that at least 50% of the additive remains in the catalyst.

For the nature of the additive, reference is made to the discussion of the additive-based starting material given before. The preferences given there are also valid here.

The additive will generally be incorporated into the catalyst composition by way of impregnation with an impregnation solution comprising the selected additive in an appropriate solvent. The solvent used in preparing the additive impregnation solution generally is water, although other compounds such as methanol, ethanol, and other alcohols may also be suitable, depending on the nature of the additive. Depending on the nature of the additive, e.g., if it is a liquid at room temperature or has a low melting point, it may be possible to incorporate the additive into the catalyst without the use of a solvent, but generally the use of a solvent is preferred to obtain a homogeneous distribution of the additive through the particle. A preferred way of performing the impregnation is by impregnating the catalyst with an impregnation solution comprising the additive in a solvent, with the total volume of the impregnation solution being in the range of the total pore volume of the catalyst to be impregnated. In this technique, which is known in the art as pore volume impregnation, the impregnation solution will be taken up virtually completely by the pores of the catalyst, which makes for an efficient use of chemicals. It was found that the appropriate amount of additive generally lies in the range of 0.01–2.5 moles of additive per mole of hydrogenation metals present in the catalyst. If the amount of additive added is too low, the advantageous effect of the present invention will not be obtained. On the other hand, the addition of an exceptionally large amount of additive will not improve the effect of the present invention.

After the impregnation step has been completed, the catalyst may be dried to remove the solvent, if present. It is essential to the process according to the invention that the drying step is effected in such a manner that the additive remains in the catalyst and is not removed by evaporation or decomposition. In consequence, the drying conditions to be applied depend strongly on the temperature at which the specific additive boils or decomposes. In the context of the present invention, the drying step should be carried out under such conditions that at least 50%, preferably at least 70%, more preferably at least 90% of the additive which was incorporated into the catalyst in the impregnation step is still present in the catalyst after the drying step. Of course, it is preferred to keep as much additive as possible in the catalyst during the drying step, but with the more volatile additives additive evaporation during the drying step cannot always be avoided. The drying step may, e.g., be carried out in air, under vacuum, or in inert gas. Generally, it is advantageous to have a drying temperature below 220° C., although a lower temperature may be necessary, depending on the nature of the additive.

The regenerated and rejuvenated catalyst obtained with the process according to the invention has an activity which is as high as that of the starting additive-based catalyst from which it was derived. Preferably, the activity is even higher. The catalyst may be used in the hydrotreating of hydrocarbon feeds in the same manner as described above for the starting additive-based catalyst. Before said use it may be presulfided in the same manner as described above for the starting additive-based catalyst.

EXAMPLES

A catalyst was prepared in accordance in Example 1 of WO 96/41848. More in particular, one kilogram of gamma-alumina extrudates was impregnated with an aqueous impregnation solution containing suitable amounts of molybdenum trioxide, cobalt carbonate, and phosphoric acid. The impregnated extrudates were dried for 16 hours at 100° C., after which the dried extrudates were calcined for three hours at 400° C. in air. The thus obtained catalyst contained 22 wt. % of molybdenum, calculated as trioxide, 3 wt. % of cobalt, calculated as oxide, and 4 wt. % of phosphorus, calculated as $P_2O_5$. The resulting catalyst was impregnated to pore volume saturation with an impregnation solution comprising an appropriate amount of diethylene glycol mixed in water to obtain an amount of 0.25 mole diethylene glycol per mole of hydrogenation metals. Then, the catalyst was dried for 16 hours at 100° C.

Two feeds were selected, namely

Feed A: Kuwait straight-run light gas oil (LGO) containing 4.14 wt. % of sulfur and 3,300 ppm of nitrogen, the feed having a density of 0.920 (at 15/4° C.) and a viscosity of 5.9 cSt (at 50° C.).

Feed B: Feed A to which 3% butane diol had been added.

The catalyst was introduced into a test reactor, where it was presulfided by being contacted with Feed B under the conditions given below. Then, the catalyst was used in the hydrotreating of Feed A under the reaction conditions given in the following table.

| | Presulfiding | Reaction conditions |
| --- | --- | --- |
| Temperature (° C.) | 316 | 390 |
| H2 pressure (kg/cm2) | 20 | 100 |
| LHSV (hr-1) | 1 | 2.0 |
| H2/feed ratio (Nl/l) | 200 | 1,000 |
| Time (hours) | 18 | 2,000 |

After 2,000 hours on stream, the catalyst was removed from the hydrotreating unit. Oil was stripped from the catalyst by stripping in air at a temperature of 300° C. for one hour. The thus obtained spent hydrotreating catalyst was used as starting material for catalyst regeneration experiments.

Catalysts A, B, and C according to the invention were obtained by regeneration for two hours at a temperature of, respectively, 450° C., 400° C., and 350° C. in air. The catalysts were then impregnated via pore volume impregnation with an impregnation solution comprising water and polyethylene glycol (average molecular weight 200) in a sufficient amount to obtain an amount of 0.2 mole polyethylene glycol per mole of hydrogenation metals. Then, the catalyst was dried for 16 hours at 100° C.

Comparative Catalyst 1 was prepared in the same way as Catalyst B, except that the catalyst was regenerated for 30 minutes at 520° C. in air.

Comparative Catalyst 2 was prepared in the same way as Catalyst B, except that no polyethylene glycol was incorporated into the catalyst composition.

The catalysts were presulfided by being contacted with Feed B under the conditions given below. Then, they were tested in the hydrotreating of Feed A under the test conditions given in the following table.

|  | Presulfiding | Reaction conditions |
| --- | --- | --- |
| Temperature (° C.) | 316 | 330 |
| H2 pressure (kg/cm2) | 20 | 30 |
| LHSV (hr-1) | 1 | 2.0 |
| H2/feed ratio (Nl/l) | 200 | 300 |
| Time (hours) | 18 | 2,000 |

The relative volume activities for the various catalysts were determined as follows. For each catalyst the reaction constant $k_n$ was calculated from the following formula:

$$k_n = LHSV*1/(n-1)*(1/S^{n-1} - 1/S_0^{n-1})$$

in which the S stands for the percentage of sulfur in the product, $S_0$ stands for the percentage of sulfur in the feed, and n stands for the reaction order of the hydrodesulfurization reaction. In the present experiments, n has the value 1.75. The initial activity of the starting catalyst was set at 100, and the reaction constants of the other catalysts were recalculated to obtain the relative volume activities. The percentage of sulfur present in the feed and in the product was determined using an SLFA-920 of Horiba Manufacturing Co., Ltd.

| Catalyst | carbon content after regeneration | Activity |
| --- | --- | --- |
| Starting Catalyst | — | 100 |
| Spent Catalyst | — | 50 |
| Catalyst A | <0.1 wt. % | 90 |
| Catalyst B | 0.2 wt. % | 98 |
| Catalyst C | 0.45 wt. % | 102 |
| Catalyst 1 (comparative) | 0 wt. % | 66 |
| Catalyst 2 (comparative) | 0.22 wt. % | 60 |

The above results show that the combination of mild regeneration and rejuvenation makes it possible to restore the activity of the catalyst to its original level. Severe regeneration in combination with rejuvenation, or mild regeneration without rejuvenation, gives inferior results.

The invention claimed is:

1. A process for regenerating and rejuvenating an additive-based catalyst that has been used as a hydrotreating catalyst containing Group VIB and Group VIII hydrogenation metals, comprising the steps of regenerating the catalyst subsequent to its use as a hydrotreating catalyst by contacting it with an oxygen-containing gas at a maximum temperature of 500° C., followed by rejuvenating the catalyst by contacting it with an organic additive comprising an organic compound, other than a compound that said catalyst is contacted with in the course of its use as a hydrotreating catalyst prior to regeneration and rejuvenation, selected from one or more compounds selected from the group consisting of a compound having at least two hydroxyl groups and 2–10 carbon atoms per molecule, a (poly)ether of a compound with at least two hydroxyl groups and 2–10 carbon atoms per molecule, and a compound comprising at least one covalently bonded nitrogen atom and at least one carbonyl moiety, and incorporating said organic additive into said catalyst.

2. The process of claim 1 wherein said organic additive comprises a compound comprising at least one covalently bonded nitrogen atom and at least one carbonyl moiety.

3. A process for regenerating and rejuvenating an additive-based hydrotreating catalyst containing Group VIB and Group VIII hydrogenation metals, comprising the steps of regenerating the catalyst by contacting it with an oxygen-containing gas at a maximum temperature of 500° C., followed by rejuvenating the catalyst by contacting it with an organic additive comprising one or more compounds selected from the group consisting of a compound having at least two hydroxyl groups and 2–10 carbon atoms per molecule, a (poly)ether of a compound with at least two hydroxyl groups and 2–10 carbon atoms per molecule, and a compound comprising at least one covalently bonded nitrogen atom and at least one carbonyl moiety.

* * * * *